US008446628B2

(12) United States Patent
Kashimoto

(10) Patent No.: US 8,446,628 B2
(45) Date of Patent: May 21, 2013

(54) IMAGE FORMING APPARATUS AND IMAGE FORMING METHOD HAVING IMPROVED RENDERING

(75) Inventor: Yosuke Kashimoto, Osaka (JP)

(73) Assignee: KYOCERA Document Solutions Inc. (JP)

( * ) Notice: Subject to any disclaimer, the term of this patent is extended or adjusted under 35 U.S.C. 154(b) by 707 days.

(21) Appl. No.: 12/689,612

(22) Filed: Jan. 19, 2010

(65) Prior Publication Data
US 2010/0195149 A1 Aug. 5, 2010

(30) Foreign Application Priority Data

Feb. 5, 2009 (JP) ................................. 2009-024441

(51) Int. Cl.
*G06K 15/00* (2006.01)
(52) U.S. Cl.
USPC ......................................... 358/1.16; 382/232
(58) Field of Classification Search
USPC ....................................................... 382/232
See application file for complete search history.

(56) References Cited

U.S. PATENT DOCUMENTS

| 5,337,258 | A | * | 8/1994 | Dennis | 714/47.3 |
|---|---|---|---|---|---|
| 5,471,563 | A | * | 11/1995 | Dennis et al. | 358/1.15 |
| 5,471,564 | A | * | 11/1995 | Dennis et al. | 358/1.15 |
| 6,052,200 | A | * | 4/2000 | Mitani | 358/1.16 |
| 6,124,943 | A | * | 9/2000 | Mitani | 358/1.17 |
| 6,348,969 | B1 | * | 2/2002 | Ikeda | 358/1.15 |
| 6,369,910 | B1 | * | 4/2002 | Mitani | 358/1.17 |
| 2004/0085559 | A1 | * | 5/2004 | Danilo | 358/1.12 |
| 2004/0257371 | A1 | * | 12/2004 | Payne et al. | 345/506 |
| 2005/0024684 | A1 | * | 2/2005 | Rao et al. | 358/2.1 |
| 2005/0030580 | A1 | * | 2/2005 | Moroi | 358/1.15 |
| 2008/0291496 | A1 | * | 11/2008 | Hara | 358/1.16 |
| 2009/0080024 | A1 | * | 3/2009 | Liu et al. | 358/1.16 |

FOREIGN PATENT DOCUMENTS

| JP | 10-147017 | 6/1998 |
|---|---|---|
| JP | 11-249833 | 9/1999 |
| JP | 2001-071572 | 3/2001 |

\* cited by examiner

*Primary Examiner* — Twyler Haskins
*Assistant Examiner* — Nicholas Pachol
(74) *Attorney, Agent, or Firm* — McDonnell Boehnen Hulbert & Berghoff LLP

(57) ABSTRACT

An image forming apparatus includes a rendering time calculating unit configured to calculate rendering times for respective pieces of intermediate data, a rendering control unit configured to determine which of a pre-rendering process and a real-time rendering process is to be performed on the respective pieces of intermediate data based on the rendering times, rendering being performed before output of a piece of intermediate data in the pre-rendering process and rendering being performed in parallel with output of another piece of intermediate data in the real-time rendering process, and the rendering control unit further configured to allow a rendering unit to perform either of the pre-rendering process or the real-time rendering process, a reading unit configured to read the pieces of rendered data, and an output unit configured to output to a printer engine the pieces of rendered data read by the reading unit.

17 Claims, 8 Drawing Sheets

FIG.3

| BAND | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| RENDERING TIME (R) | 60 | 40 | 40 | 60 | 160 | 160 | 220 | 160 | 240 | 300 | 120 | 80 | 80 | 140 |
| MARGIN T | 0 | 60 | 120 | 120 | 40 | -20 | 20 | -40 | -20 | 20 | 0 | 20 | 40 | 0 |
| MARGIN t | 0 | 60 | 100 | 100 | 40 | 140 | 20 | 120 | 220 | 20 | 0 | 20 | 40 | 0 |
| RENDERING TYPE | SP | REAL | REAL | REAL | REAL | PRE | REAL | PRE | PRE | REAL | REAL | REAL | REAL | REAL |

(OUTPUT TIME 100ms)

FIG.6

(A) TRANSITION OF WRITE MEMORY NUMBERS AND BAND NUMBERS

| PROCESS | WM1 | WM2 | WM3 | COUNT |
|---|---|---|---|---|
| PRE | 6 | | | + |
| PRE | | 8 | | + |
| PRE | | | 9 | + |
| SPECIAL | 1 | | | + |
| REAL | | 2 | | + |
| REAL | | | 3 | + |
| REAL | 4 | | | + |
| REAL | | 5 | | + |
| REAL | | | 7 | + |
| DECOMPRESSION | 6 | | | + |
| DECOMPRESSION | | 10 | | − |
| DECOMPRESSION | 8 | | 9 | − |
| REAL | 11 | | | + |
| REAL | | | 12 | − |
| REAL | | 13 | | − |
| REAL | 14 | | | − |

(B) TRANSITION OF READ MEMORY NUMBERS AND BAND NUMBERS

| PROCESS | RM1 | RM2 | RM3 | COUNT | OUTPUT |
|---|---|---|---|---|---|
| PRE | 6 | | | + | COMPRESSION |
| PRE | | 8 | | + | COMPRESSION |
| PRE | | | 9 | − | COMPRESSION |
| SPECIAL | 1 | | | + | OUTPUT |
| REAL | | 2 | | + | OUTPUT |
| REAL | | | 3 | + | OUTPUT |
| REAL | 4 | | | + | OUTPUT |
| REAL | | 5 | | + | OUTPUT |
| REAL | | | | − | OUTPUT |
| DECOMPRESSION | 6 | | 7 | + | OUTPUT |
| DECOMPRESSION | 8 | | 9 | − | OUTPUT |
| DECOMPRESSION | | 10 | | − | OUTPUT |
| REAL | 11 | | | − | OUTPUT |
| REAL | | | 12 | − | OUTPUT |
| REAL | | 13 | | − | OUTPUT |
| REAL | 14 | | | − | OUTPUT |

IMAGE FORMING APPARATUS AND IMAGE FORMING METHOD HAVING IMPROVED RENDERING

INCORPORATION BY REFERENCE

This application is based upon and claims the benefit of priority from corresponding Japanese Patent Application No. 2009-024441, filed Feb. 5, 2009, the entire contents of which is incorporated herein by reference.

BACKGROUND

1. Field of the Invention

The present invention relates to an image forming apparatus and an image forming method for performing a banding process. More specifically, the present invention relates to an image forming apparatus and an image forming method for enhancing an output throughput by controlling allocation of a memory that holds rendered data.

2. Description of the Related Art

In the field of page printers that receive print data from a host computer and that output images in units of pages, a banding process is generally performed.

The banding process is the following process. A rendering area of one page is divided into a plurality of rectangular areas (bands), and a rendering process is performed on one of the bands. Then, outputting of that band and rendering on the next band are simultaneously performed. This process is repeated a number of times corresponding to the number of bands, whereby an output of one page is obtained.

In the banding process, at least two memories (rendering memory and output memory) capable of holding rendered data of one band are sufficient, thereby shortening the time until first printing.

Under typical operation due to its printing mechanism, such an image forming apparatus does not stop outputting at the middle of a page. In a case where there is a band that requires excessive time for rendering, output of that band can be started only after the rendering of the band has been completed, even when output of the preceding band ends. This causes an error called an overrun. Hitherto, a pre-rendering process has been performed to prevent such an overrun.

In the pre-rendering process, a rendering time of each band is calculated and is compared with an output time, and a band that is estimated to cause overrun is extracted.

On such a band, a rendering process is performed prior to output, so that overrun is prevented.

However, the pre-rendering process causes the time until first printing to become longer, which decreases a favorable output throughput. Furthermore, a memory for storing a pre-rendered band is necessary.

SUMMARY

The present invention provides an image forming apparatus with an efficient output while overcoming a problem of overrun caused by a banding process that utilizes a pre-rendering process.

An image forming apparatus according to an embodiment of the present invention includes an intermediate data generating unit, a rendering unit, a storage unit, a rendering time calculating unit, a rendering control unit, a pre-writing unit, a decompressing unit, a rendering writing unit, a reading unit, and an output unit. The intermediate data generating unit is configured to divide image data into predetermined bands and generate pieces of intermediate data corresponding to the bands. The rendering unit is configured to perform a rendering process on the pieces of intermediate data in a predetermined band order. The storage unit is configured to store pieces of rendered data obtained through the rendering process. The rendering time calculating unit is configured to calculate rendering times for the respective pieces of intermediate data generated by the intermediate data generating unit. The rendering control unit is configured to determine which of a pre-rendering process and a real-time rendering process is to be performed on the respective pieces of intermediate data based on the rendering times, rendering being performed before output of a piece of intermediate data in the pre-rendering process and rendering being performed in parallel with output of another piece of intermediate data in the real-time rendering process, and to cause the rendering unit to perform either of the pre-rendering process and the real-time rendering process. The pre-writing unit is configured to compress pieces of rendered data obtained through the pre-rendering process and write the pieces of rendered data in a predetermined compression storage area of the storage unit. The decompressing unit is configured to perform a decompressing process on the pieces of rendered data written in the compression storage area of the storage unit. The rendering writing unit is configured to write the pieces of rendered data obtained through performance of one of rendering process and the decompressing process in a storage area selected from the storage unit. The reading unit is configured to read the pieces of rendered data written in the storage areas in the predetermined band order. The output unit is configured to output to a printer engine the pieces of rendered data read by the reading unit.

An image forming method according to an embodiment of the present invention includes an intermediate data generating step, a rendering time calculating step, a rendering control step, a pre-writing step, a decompressing step, a rendering writing step, a reading step, and an output step. The intermediate data generating step comprises dividing image data into predetermined bands and generating pieces of intermediate data corresponding to the bands. The rendering time calculating step comprises calculating rendering times for the respective pieces of intermediate data generated in the intermediate data generating step. The rendering control step comprises determining which of a pre-rendering process and a real-time rendering process is to be performed on the respective pieces of intermediate data based on the rendering times, rendering being performed before output of a piece of intermediate data in the pre-rendering process and rendering being performed in parallel with output of another piece of intermediate data in the real-time rendering process, and allowing either of the pre-rendering process and the real-time rendering process to be performed. The pre-writing step comprises compressing pieces of rendered data obtained through the pre-rendering process and writing the pieces of rendered data in a predetermined compression storage area. The decompressing step comprises performing a decompressing process on the pieces of rendered data written in the compression storage area. The rendering writing step comprises writing the pieces of rendered data obtained through performance of the real-time rendering process or the decompressing process in any of storage areas selected from a storage unit on the basis of a predetermined rule. The reading step comprises reading the pieces of rendered data written in the storage areas in a predetermined band order. The output step comprises outputting the pieces of rendered data read from the storage unit to a printer engine.

Additional features and advantages are described herein, and will be apparent from the following Detailed Description and the figures.

BRIEF DESCRIPTION OF THE FIGURES

In the accompanying drawings:

FIG. 3 is a table illustrating an analysis result of sample print data in units of bands used in the embodiment;

FIGS. 6A and 6B are tables illustrating the correspondence between the transition of memory numbers and band numbers in a case where the image forming apparatus according to the embodiment renders and outputs the sample print data illustrated in FIG. 3;

DETAILED DESCRIPTION

Hereinafter, an image forming apparatus according to an embodiment of the present invention will be described with reference to FIGS. 1 to 8.

Figure 1:
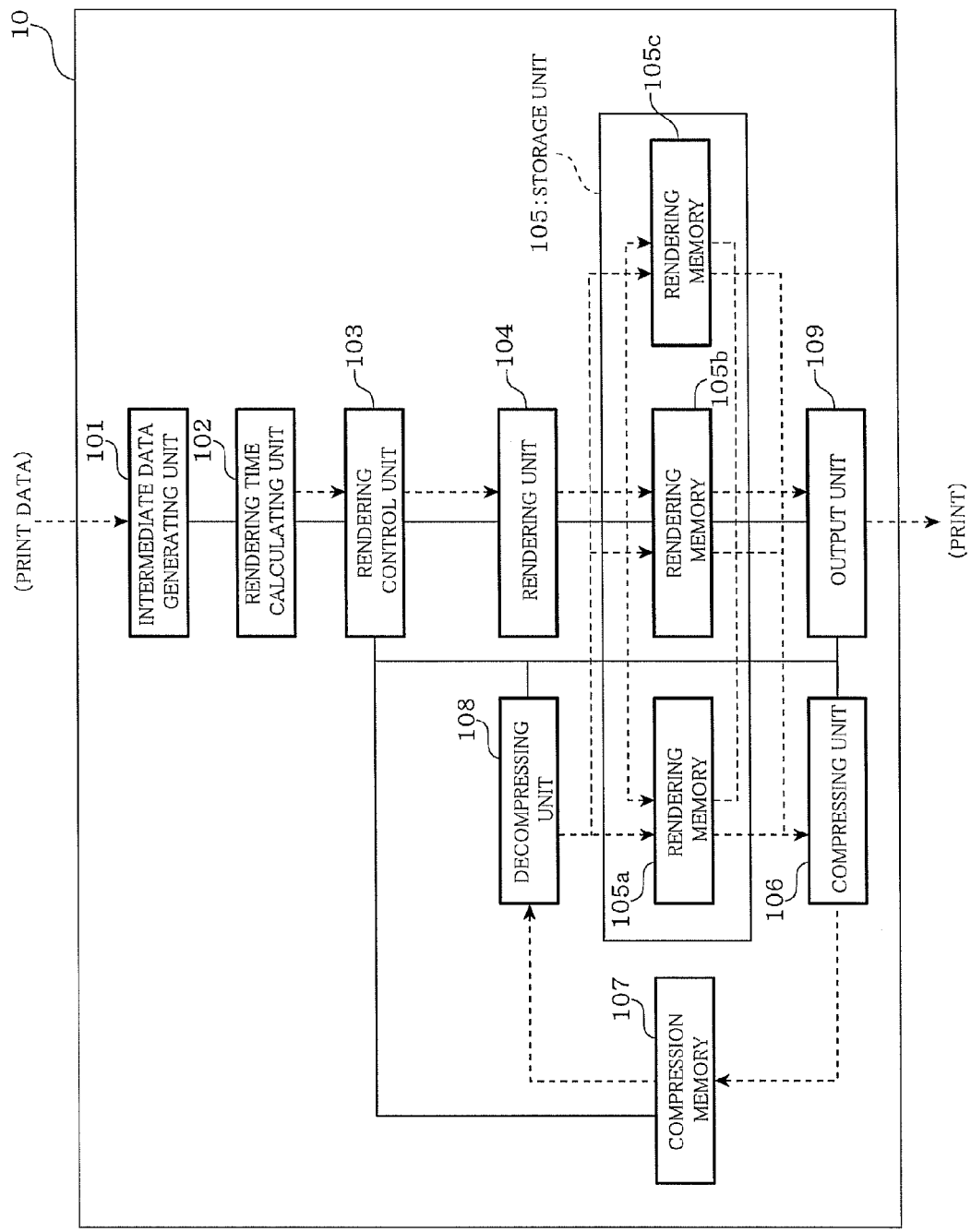
FIG. 1 is a block diagram illustrating a configuration of an image forming apparatus according to an embodiment of the present invention.

FIG. 1 is a block diagram illustrating a configuration of an image forming apparatus 10 according to an embodiment of the present invention.

The image forming apparatus 10 according to the embodiment is a page printer that performs rendering and output in units of pages. The page printer receives print data output from a host computer, performs various processes necessary to form images, and prints the images on a sheet.

An intermediate data generating unit 101 interprets print data described by PDL (page description language) or the like received from the host computer and converts the print data into intermediate data.

During generation of the intermediate data, the intermediate data generating unit 101 divides image data of each page into predetermined areas (hereinafter referred to as bands) thereby generating a plurality of bands, and generates intermediate data in units of bands.

A rendering time calculating unit 102 calculates rendering times for the pieces of intermediate data of the respective bands generated by the intermediate data generating unit 101.

The rendering time calculating unit 102 logically calculates the rendering times on the basis of the width and height of respective objects included in the respective bands.

A rendering control unit 103 determines which of a pre-rendering process and a real-time rendering process is to be performed as a rendering process on each of the pieces of intermediate data based on the calculated rendering times.

Also, the rendering control unit 103 performs such a determination of a rendering type for each of the bands and allows a rendering unit 104 to perform a rendering process based on the determination.

Here, "pre-rendering process" means a process of rendering prior to output of intermediate data in order to prevent the occurrence of overrun.

On the other hand, "real-time rendering process" means a process of rendering in parallel with output of another piece of intermediate data, which is typically performed in a banding process.

The rendering control unit 103 allows the rendering unit 104 to perform a "special rendering process" on the piece of intermediate data of the first band. In the special rendering process, rendering is performed after the pre-rendering process and before the real-time rendering process.

In the special rendering process, rendering is performed before output of the first band. The special rendering process is fixedly performed regardless of the rendering time of the band.

Hereinafter, a process of determining any of the above-described rendering types will be described.

Figure 2:
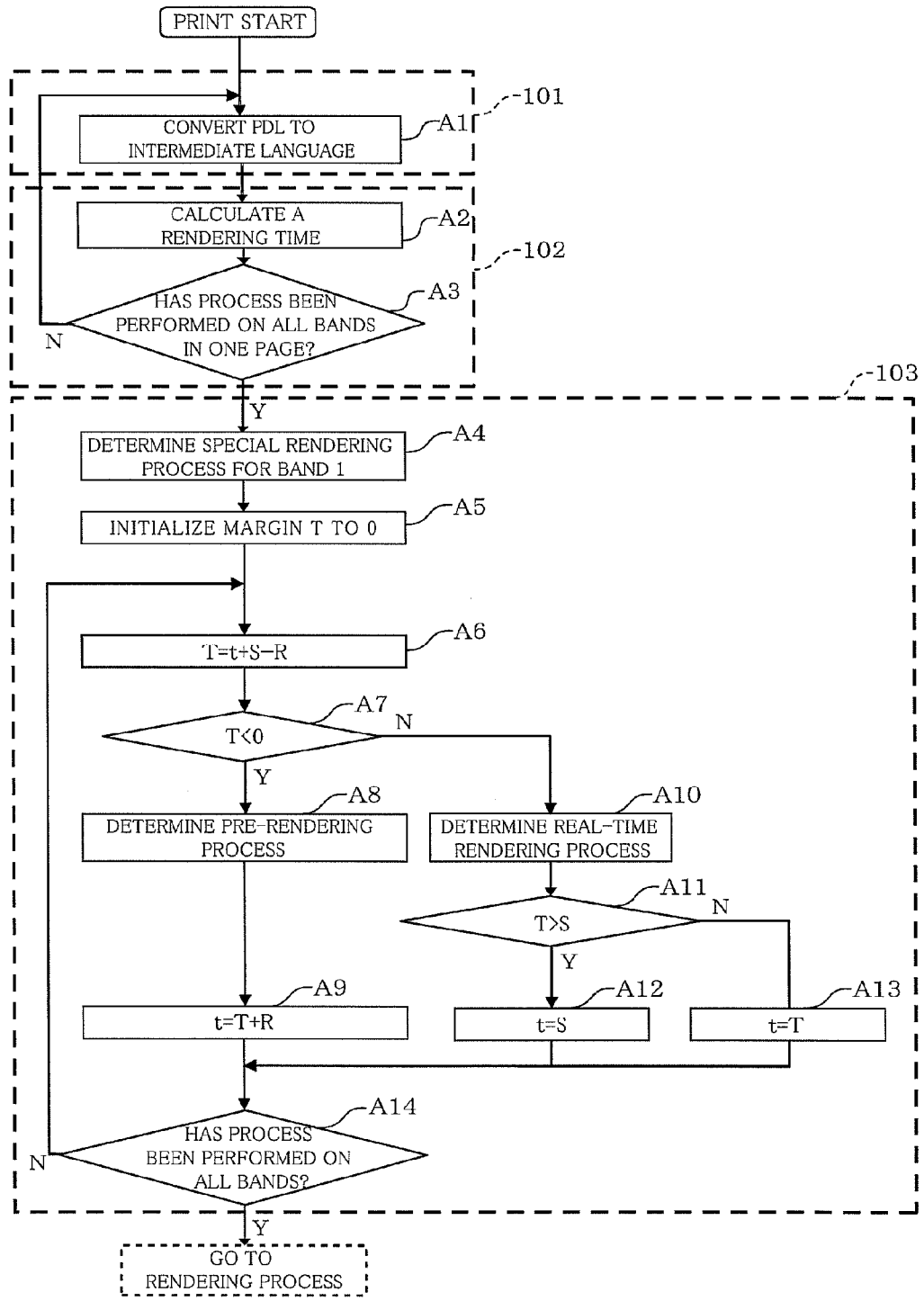
FIG. 2 is a flowchart illustrating a process of determining a rendering type performed by the image forming apparatus according to the embodiment.

FIG. 2 is a flowchart illustrating a process of determining a rendering type performed by the image forming apparatus 10 according to the embodiment. Specifically, the determining process is performed by the intermediate data generating unit 101, the rendering time calculating unit 102, and the rendering control unit 103.

FIG. 3 is a table illustrating an analysis result of sample print data in units of bands used in the embodiment.

Here, assume that the image forming apparatus 10 according to the embodiment receives and obtains the sample print data illustrated in FIG. 3 from the host computer before the operation steps described below.

As illustrated in FIG. 2, in the image forming apparatus 10 according to the embodiment, the intermediate data generating unit 101 interprets print data (PDL) and generates intermediate data divided into a predetermined number of bands (A1).

The rendering time calculating unit 102 calculates a rendering time of each of the bands (A2).

Steps A1 and A2 are repeatedly performed on all the bands forming a page (A3).

As a result, rendering times for bands 1 to 14 forming the sample print data are obtained (see FIG. 3).

After the preprocessing in steps A1 to A3, a rendering type is determined in the following steps A4 to A14.

The rendering control unit 103 performs the special rendering process on the piece of intermediate data of the band 1, which is an initial band (A4).

"Special rendering process" is a rendering process that is performed before output of the band 1, which needs to be performed first, and is a rendering process that is performed after the pre-rendering process and before the real-time rendering process.

The rendering control unit 103 initializes a margin T and a margin t used to determine a rendering type (A5) and sets the margin T and the margin t for the band 1 to 0.

The rendering control unit 103 calculates the margins T of the second band and the subsequent bands by using the following expression (1) (A6).

$$T = t + S - R \tag{1}$$

(t represents a margin for the immediately preceding band, S represents an output time of each band, and R represents a rendering time of the band.)

The rendering control unit 103 determines which of the pre-rendering process and the real-time rendering process is to be performed on the basis of whether the margin T calculated in step A6 is smaller than 0 (A7).

If T<0 is satisfied in step A7 (YES in A7), the rendering control unit 103 determines that the pre-rendering process is to be performed on the band (A8).

After step A8, the rendering control unit 103 calculates a margin t that is used to calculate the margin T of the next band by using the following expression (2) (A9).

$$t=T+R \quad (2)$$

On the other hand, if $T \geqq 0$ is satisfied in step A7 (NO in A7), the rendering control unit 103 determines that the real-time rendering process is to be performed on the band (A10).

After step A10, the rendering control unit 103 adjusts the value of the margin t by determining whether the margin T is larger than an output time (S) (A11).

If T>S is satisfied (YES in A11), the rendering control unit 103 calculates the margin t by using the following expression (3) (A12).

$$t=S \quad (3)$$

If $T \leqq S$ is satisfied (NO in A11), the rendering control unit 103 calculates the margin t by using the following expression (4) (A13).

$$t=T \quad (4)$$

Then, steps A6 to A13 are performed on all the bands belonging to a page, that is, the bands 1 to 14 (A14).

With this process, the rendering types of the respective bands are determined as illustrated at the bottom of the table in FIG. 3.

Also, the rendering order of the bands is determined as follows.

"band 6"→"band 8"→"band 9" (pre-rendering process for these bands)→"band 1" (special rendering process for this band)→"band 2"→"band 3"→"band 4"→"band 5"→"band 7"→"band 10"→"band 11"→"band 12"→"band 13"→"band 14" (real-time rendering process for these bands)

A detailed description will be given by using the band 1, band 2, and band 8 as an example among the bands illustrated in the table in FIG. 3. In this example, the output time S per band is constant at 100 ms.

(Band 1)

The band 1 is fixedly determined that the special rendering process is to be performed thereon, as described above in step A4. A value 0 is set to the margin t as described above in step A5.

(Band 2)

A margin $T_2$ in the band 2 is calculated on the basis of the above expression (1).

According to the table in FIG. 3, t=0, S=100 ms, and R=40 ms, and thus $T_2$=0+100−40=60.

Therefore, according to the determination in step A7, $T_2 \geqq 0$ is satisfied (NO in A7), and thus it is determined that the real-time rendering process is to be performed on the band 2 (A10).

In step A11, $T_2 \leqq$ output time S is satisfied (NO in A11), and thus adjustment is performed so that t=T, that is, t=60 is satisfied (A13), which is used to calculate the margin T of the band 3.

(Band 8)

A margin $T_8$ in the band 8 is also calculated on the basis of the above expression (1).

According to the table in FIG. 3, t=20, S=100 ms, and R=160, and thus $T_8$=20+100−160=−40.

Therefore, according to the determination in step A7, $T_8$<0 is satisfied (YES in A7), and thus it is determined that the pre-rendering process is to be performed on the band 8.

In step A9, $T_8 \leqq$ output time S is satisfied, and thus adjustment is performed so that t=T+R=(−40)+160=120, which is used to calculate the margin T of the band 9.

The rendering unit 104 generates rendered data in units of bands by performing a rendering process on the respective pieces of intermediate data under control by the rendering control unit 103.

Each of the generated pieces of rendered data is written in any of rendering memories 105a to 105c of a storage unit 105 (an example of a rendering writing unit and a pre-writing unit).

The pieces of rendered data written in the rendering memories 105a to 105c are held there until output thereof has ended.

The storage unit 105 includes the three rendering memories 105a to 105c. The pieces of rendered data of the respective bands generated by the rendering unit 104 or the pieces of rendered data decompressed by a decompressing unit 108 are written in the rendering memories 105a to 105c. At that time, the pieces of rendered data are written with the rendering memories 105a to 105c being sequentially switched.

In the embodiment, the switching order 105a→105b→105c is called a positive order (+) whereas the opposite is called a negative order (−), with the rendering memory 105a being a reference, for example. The positive order (+) is set as an initial value.

For example, in a basic operation, pieces of rendered data are sequentially written in the three rendering memories in the following cycle: band 1→105a, band 2→105b, band 3→105c, band 4→105a, band 5→105b, . . . .

However, consider the case where a piece of compressed rendered data related to the pre-rendering process is written in the rendering memory that had held the piece of rendered data of the band located two bands before (regardless of the foregoing cycle). In this case, the rendering process can be efficiently performed by changing the above-described writing cycle.

The storage unit 105 may include one memory that is divided logically into three storage areas.

A compressing unit 106 converts rendered data as a target of compression to a compressed data format, thereby reducing the data size thereof. Specifically, the compressing unit 106 performs a compressing process by extracting rendered data as a target of the pre-rendering process from the rendering memory.

A compression memory 107 temporarily holds rendered data that has been compressed by the compressing unit 106.

The decompressing unit 108 decompresses the compressed data held in the compression memory 107 at predetermined timing to recover the original rendered data. The decompressed rendered data is written in the rendering memories 105a to 105c.

A decompressing time for the decompressed data is shorter than the output time. The image forming apparatus 10 according to the embodiment performs a decompressing process at the same time as the start of output of the immediately preceding band (or the end of rendering of the band located two bands before), so that the memory holding time of the decompressed data can be shortened.

An output unit 109 reads the pieces of rendered data held in the rendering memory 105a to 105c in the band order and outputs the pieces of rendered data to a printer engine.

Now, writing and reading processes of the three memories of the image forming apparatus 10 according to the embodiment will be described.

Figure 4:
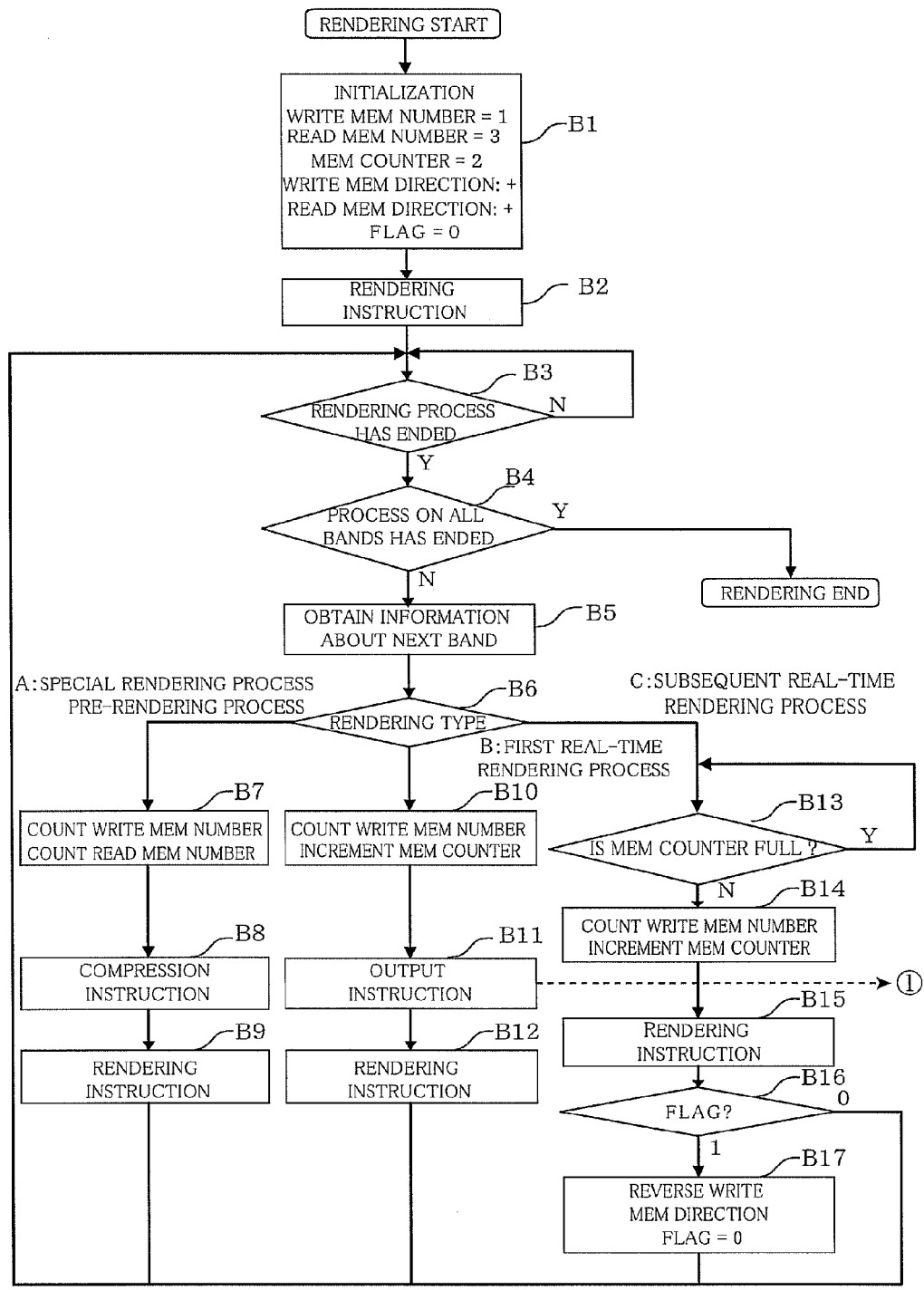
FIG. 4 is a flowchart illustrating a writing method in a rendering memory in a case where the image forming apparatus according to the embodiment renders the sample print data illustrated in FIG. 3.

FIG. 4 is a flowchart illustrating a writing method in the rendering memories in a case where the image forming apparatus 10 renders the sample print data illustrated in FIG. 3.

Figure 5:
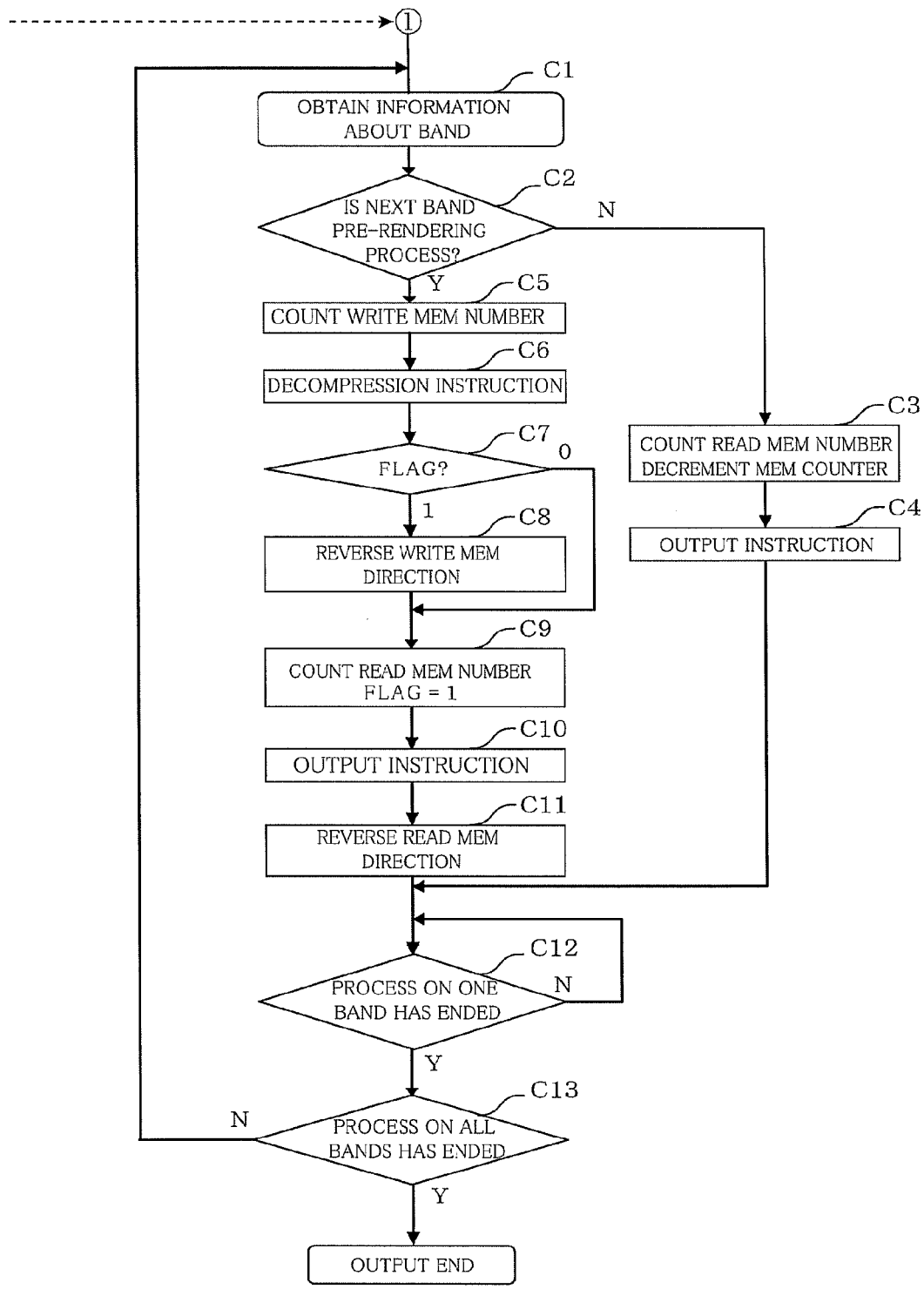
FIG. 5 is a flowchart illustrating a reading method in the rendering memory in a case where the image forming apparatus according to the embodiment outputs the sample print data illustrated in FIG. 3.

FIG. 5 is a flowchart illustrating a reading method in the rendering memories in a case where the image forming apparatus 10 outputs the sample print data illustrated in FIG. 3.

The rendering process and output process described below are not actual processes, but are computing processes that are virtually performed by a CPU (central processing unit) or the like to preset a write memory and a read memory.

As illustrated in FIG. 4, a predetermined initializing process is performed prior to a rendering process (B1).

A write memory number is set to "1", a read memory number is set to "3", and a memory counter is set to "2". A memory number 1 corresponds to the rendering memory 105a, a memory number 2 corresponds to the rendering memory 105b, and a memory number 3 corresponds to the rendering memory 105c. For example, when the write order is positive "+", writing is repeated in the cycle of 1 to 3, that is, 1→2→3→1→2, with each increment. When the read order is positive "+", reading is repeated in the same cycle with each increment.

The initial values of the write order and the read order are set to "+", and the initial value of a flag is set to "0".

The respective steps from step B2 illustrated in FIG. 4 are performed for the respective bands under control by the rendering control unit 103 based on the rendering order that has already been determined.

The rendering control unit 103 provides a rendering instruction for the band 6 corresponding to the first band, so that rendered data is generated (B2).

The write memory number is the initial value "1", and thus the rendered data of the band 6 is written in the rendering memory 105a corresponding to the memory number 1.

The end of the rendering process is awaited (YES in B3), and the process proceeds to the next step except in a case where the rendering process on all the bands has ended (B4).

The rendering control unit 103 obtains various pieces of information about the band 8, which is the next target of the rendering process (B5). Specifically, the rendering control unit 103 obtains information about the rendering type and the rendering order of the band. The obtained information is used for the determination made in step B6.

The rendering control unit 103 determines the rendering type of the band 8 (B6).

As a result of the determination made in step B6, it is determined that the pre-rendering process is to be performed on the band 8 ("A" in B6). The write memory number is incremented by 1 so that the write memory number is set to "2", and also the read memory number is incremented by 1 so that the read memory number is set to "1" (B7).

After the setting of the memory performed in step B7, the rendered data of the band 6 is read from the rendering memory 105a corresponding to the read memory number "1" and a compressing process is performed thereon, and the compressed data is held in the compression memory 107 (B8). Then, a rendering process is performed on the band 8 and the rendered data is written in the rendering memory 105b corresponding to the write memory number "2" (B9).

After the rendering process on the band 8 has ended (YES in B3), the process proceeds to the next step (B4) except in a case where the rendering process on all the bands has ended.

The rendering control unit 103 obtains various pieces of information about the band 9, which is the next target of the rendering process (B5), and determines the rendering type of the band 9 (B6).

As a result of the determination made in step B6, it is determined that the pre-rendering process is to be performed on the band 9 ("A" in B6). The write memory number is incremented by 1 so that the write memory number is set to "3", and also the read memory number is incremented by 1 so that the read memory number is set to "2" (B7).

After the setting of the memory performed in step B7, the rendered data of the band 8 is read from the rendering memory 105b corresponding to the read memory number "2" and a compressing process is performed thereon, and the compressed data is held in the compression memory 107 (B8). Then, a rendering process is performed on the band 9 and the rendered data is written in the rendering memory 105c corresponding to the write memory number "3" (B9).

After the rendering process on the band 9 has ended (YES in B3), the process proceeds to the next step, except in a case where the rendering process on all the bands has ended.

The rendering control unit 103 obtains various pieces of information about the band 1, which is the next target of the rendering process (B5), and determines the rendering type of the band 1 (B6).

As a result of the determination made in step B6, it is determined that the special rendering process is to be performed on the band 1 ("A" in B6). The write memory number is incremented by 1 so that the write memory number is set to "1", and also the read memory number is incremented by 1 so that the read memory number is set to "3" (B7).

After the setting of the memory performed in step B7, the rendered data of the band 9 is read from the rendering memory 105c corresponding to the read memory number "3" and a compressing process is performed thereon, and the compressed data is held in the compression memory 107 (B8). Then, the rendered data of the band 1 is written in the rendering memory 105a corresponding to the write memory number "1" (B9).

After the rendering process on the band 1 has ended (YES in B3), the process proceeds to the next step except in a case where the rendering process on all the bands has ended.

The rendering control unit 103 obtains various pieces of information about the band 2, which is the next target of the rendering process (B5), and determines the rendering type of the band 2 (B6).

As a result of the determination made in step B6, it is determined that the first real-time rendering process is to be performed on the band 2 ("B" in B6). The write memory number is incremented by 1 so that the write memory number is set to "2", and also the memory counter is incremented by 1 to "3" (B10).

An output instruction is issued after the process in step B10 (B11), so that a program related to the write memory and a program related to the read memory are executed in parallel in conjunction with each other at this timing.

The rendered data of the band 2 is written in the rendering memory 105b corresponding to the write memory number "2" (B12).

After the rendering process on the band 2 has ended (YES in B3), the process proceeds to the next step except in a case where the rendering process on all the bands has ended.

The rendering control unit 103 obtains various pieces of information about the band 3, which is the next target of the rendering process (B5), and determines the rendering type of the band 3 (B6).

As a result of the determination made in step B6, it is determined that a subsequent real-time rendering process is to be performed on the band 3 ("C" in B6). Then, it is determined whether the memory counter is full (3) (B13).

Since the memory counter is full (YES in B13), the process cannot proceed to the next step until the memory counter is decremented. All of the three rendering memories 105*a* to 105*c* are in a state of holding rendered data. Writing of the next rendered data is restricted until any of the memories becomes free by an output process (see step C3 in FIG. 5).

Then, the process proceeds to the output process illustrated in FIG. 5.

In the output process illustrated in FIG. 5, a series of steps are sequentially performed on the bands 1 to 14.

First, band information (rendering type, etc.) about the band 1 is obtained (C1).

It is determined whether the band next to the band 1 is the target of the pre-rendering process (C2).

As a result of the determination made in step C2, the band 2 is not the target of the pre-rendering process (NO in C2), and thus the read memory number is incremented by 1 and the memory counter is decremented by 1 (C3).

Since the read memory number is "3", the read memory number is set to "1", whereas the memory counter changes from "3" to "2".

After the memory setting performed in step C3, the rendered data of the band 1 is read from the rendering memory 105*a* corresponding to the read memory number "1", and the output process is performed (C4).

The next process is kept in a standby state until the process for one band ends (C12).

The process proceeds to the next step except in a case where the process on all the bands has ended (C13).

The process returns to step B13 in FIG. 4. Since the memory counter is not full any more due to the process in step C3 (NO in B13), the write memory number is incremented by 1 to set the write memory number to "3", and also the memory counter is incremented by 1 to "3" (B14).

After the memory setting performed in step B14, the rendered data of the band 3 is written in the rendering memory 105*c* corresponding to the write memory number "3" (B15).

A flag determination is performed (B16). It is determined that "flag=0", and thus the process proceeds to step B3.

After the rendering process on the band 3 has ended (YES in B3), the process proceeds to the next step except in a case where the rendering process on all the bands has ended.

The rendering control unit 103 obtains various pieces of information about the band 4, which is the next target of the rendering process (B5), and determines the rendering type of the band 4 (B6).

As a result of the determination made in step B6, it is determined that a subsequent real-time rendering process is to be performed on the band 4 ("C" in B6). Then, it is determined whether the memory counter is full (3) (B13).

As a result of the determination made in step B13, the memory counter is full, and thus the process proceeds to the output process illustrated in FIG. 5.

As illustrated in FIG. 5, band information (rendering type, etc.) about the band 2 is obtained (C1).

It is determined whether the band 3, next to the band 2, is the target of the pre-rendering process (C2).

As a result of the determination made in step C2, the band 3 is not the target of the pre-rendering process (NO in C2), and thus the read memory number is incremented by 1 and the memory counter is decremented by 1 (C3).

Since the read memory number is "1", the read memory number is set to "2", whereas the memory counter changes from "3" to "2".

After the memory setting performed in step C3, the rendered data of the band 2 is read from the rendering memory 105*b* corresponding to the read memory number "2", and the output process is performed (C4).

The next process is kept in a standby state until the process for one band ends (C12).

The process proceeds to the next step except in a case where the process on all the bands has ended (C13).

The process returns to step B13 in FIG. 4. Since the memory counter is not full any more due to the process in step C3 (NO in B13), the write memory number is incremented by 1 to set the write memory number to "1", and also the memory counter is incremented by 1 to "3" (B14).

After the memory setting performed in step B14, the rendered data of the band 4 is written in the rendering memory 105*a* corresponding to the write memory number "1" (B15).

A flag determination is performed (B16). It is determined that "flag=0", and thus the process proceeds to step B3.

After the rendering process on the band 4 has ended (YES in B3), the process proceeds to the next step except in a case where the rendering process on all the bands has ended.

The rendering control unit 103 obtains various pieces of information about the band 5, which is the next target of the rendering process (B5), and determines the rendering type of the band 5 (B6).

As a result of the determination made in step B6, it is determined that a subsequent real-time rendering process is to be performed on the band 5 ("C" in B6). Then, it is determined whether the memory counter is full (3) (B13).

As a result of the determination made in step B13, the memory counter is full, and thus the process proceeds to the output process illustrated in FIG. 5.

As illustrated in FIG. 5, band information (rendering type, etc.) about the band 3 is obtained (C1).

It is determined whether the band 4, next to the band 3, is the target of the pre-rendering process (C2).

As a result of the determination made in step C2, the band 4 is not the target of the pre-rendering process (NO in C2), and thus the read memory number is incremented by 1 and the memory counter is decremented by 1 (C3).

Since the read memory number is "2", the read memory number is set to "3", whereas the memory counter changes from "3" to "2".

After the memory setting performed in step C3, the rendered data of the band 3 is read from the rendering memory 105*c* corresponding to the read memory number "3", and the output process is performed (C4).

The next process is kept in a standby state until the process for one band ends (C12).

The process proceeds to the next step except in a case where the process on all the bands has ended (C13).

The process returns to step B13 in FIG. 4. Since the memory counter is not full any more due to the process in step C3 (NO in B13), the write memory number is incremented by 1 to set the write memory number to "2", and also the memory counter is incremented by 1 to "3" (B14).

After the memory setting performed in step B14, the rendered data of the band 5 is written in the rendering memory 105*b* corresponding to the write memory number "2" (B15).

A flag determination is performed (B16). It is determined that "flag=0", and thus the process proceeds to step B3.

After the rendering process on the band 5 has ended (YES in B3), the process proceeds to the next step except in a case where the rendering process on all the bands has ended.

The rendering control unit 103 obtains various pieces of information about the band 7, which is the next target of the rendering process (B5), and determines the rendering type of the band 7 (B6).

As a result of the determination made in step B6, it is determined that a subsequent real-time rendering process is to be performed on the band 7 ("C" in B6). Then, it is determined whether the memory counter is full (3) (B13).

As a result of the determination made in step B13, the memory counter is full, and thus the process proceeds to the output process illustrated in FIG. 5.

As illustrated in FIG. 5, band information (rendering type, etc.) about the band 4 is obtained (C1).

It is determined whether the band 5, next to the band 4, is the target of the pre-rendering process (C2).

As a result of the determination made in step C2, the band 5 is not the target of the pre-rendering process (NO in C2), and thus the read memory number is incremented by 1 and the memory counter is decremented by 1 (C3).

Since the read memory number is "3", the read memory number is set to "1", whereas the memory counter changes from "3" to "2".

After the memory setting performed in step C3, the rendered data of the band 4 is read from the rendering memory 105*a* corresponding to the read memory number "1", and the output process is performed (C4).

The next process is kept in a standby state until the process for one band ends (C12).

The process proceeds to the next step except in a case where the process on all the bands has ended (C13).

The process returns to step B13 in FIG. 4. Since the memory counter is not full any more due to the process in step C3 (NO in B13), the write memory number is incremented by 1 to set the write memory number to "3", and also the memory counter is incremented by 1 to "3" (B14).

After the memory setting performed in step B14, the rendered data of the band 7 is written in the rendering memory 105*c* corresponding to the write memory number "3" (B15).

A flag determination is performed (B16). It is determined that "flag=0", and thus the process proceeds to step B3.

After the rendering process on the band 7 has ended (YES in B3), the process proceeds to the next step except in a case where the rendering process on all the bands has ended.

The rendering control unit 103 obtains various pieces of information about the band 10, which is the next target of the rendering process (B5), and determines the rendering type of the band 10 (B6).

As a result of the determination made in step B6, it is determined that a subsequent real-time rendering process is to be performed on the band 10 ("C" in B6). Then, it is determined whether the memory counter is full (3) (B13).

As a result of the determination made in step B13, the memory counter is full, and thus the process proceeds to the output process illustrated in FIG. 5.

As illustrated in FIG. 5, band information (rendering type, etc.) about the band 5 is obtained (C1).

It is determined whether the band 6, next to the band 5, is the target of the pre-rendering process (C2).

As a result of the determination made in step C2, the band 6 is the target of the pre-rendering process (YES in C2), and thus the write memory number is incremented by 1 to set the write memory number to "1" (C5) in order to specify the memory in which the decompressed data of the band 6 is to be written.

A decompressing process is performed on the band 6, and the rendered data of the band 6 is written in the rendering memory 105*a* corresponding to the write memory number "1" (C6).

A flag determination is performed (C7). Since "flag=0", the read memory number is incremented by 1 to set the read memory number to "2", and "flag=1" is set (C9).

The rendered data of the band 5 is read from the rendering memory 105*b* corresponding to the read memory number "2", and the output process is performed (C10).

The read order is reversed to "−".

The next process is kept in a standby state until the process for one band ends (C12).

The process proceeds to the next step except in a case where the process on all the bands has ended (C13).

In order to perform the output process on the band 6, band information (rendering type, etc.) about the band 6 is obtained (C1).

It is determined whether the band 7, next to the band 6, is the target of the pre-rendering process (C2).

As a result of the determination made in step C2, the band 7 is not the target of the pre-rendering process (NO in C2), and thus the read memory number is incremented by 1 and the memory counter is decremented by 1(C3).

Since the read memory number is "2" and the read order is "−", the read memory number is set to "1", whereas memory counter changes from "3" to "2".

After the memory setting performed in step C3, the rendered data of the band 6 is read from the rendering memory 105*a* corresponding to the read memory number "1", and the output process is performed (C4).

The next process is kept in a standby state until the process for one band ends (C12).

The process proceeds to the next step except in a case where the process on all the bands has ended (C13).

The process returns to step B13 in FIG. 4. Since the memory counter is not full any more due to the process in step C3 (NO in B13), the write memory number is incremented by 1 to set the write memory number to "2", and also the memory counter is incremented by 1 to "3" (B14).

After the memory setting performed in step B14, the rendered data of the band 10 is written in the rendering memory 105*b* corresponding to the write memory number "2" (B15).

A flag determination is performed (B16). It is determined that "flag=1", and thus the write order is reversed to "−" and "flag=0" is set, and the process proceeds to step B3 (B17).

After the rendering process on the band 10 has ended (YES in B3), the process proceeds to the next step except in a case where the rendering process on all the bands has ended.

The rendering control unit 103 obtains various pieces of information about the band 11, which is the next target of the rendering process (B5), and determines the rendering type of the band 11 (B6).

As a result of the determination made in step B6, it is determined that a subsequent real-time rendering process is to be performed on the band 11 ("C" in B6). Then, it is determined whether the memory counter is full (3) (B13).

As a result of the determination made in step B13, the memory counter is full, and thus the process proceeds to the output process illustrated in FIG. 5.

In order to perform the output process on the band 7, band information (rendering type, etc.) about the band 7 is obtained (C1).

It is determined whether the band 8, next to the band 7, is the target of the pre-rendering process (C2).

As a result of the determination made in step C2, the band 8 is the target of the pre-rendering process (YES in C2), and thus the write memory number is incremented by 1 in order to specify the memory in which the decompressed data of the band 8 is to be written.

The write memory number is "2" and the write order is "−", and thus the write memory number is set to "1" (C5).

A decompressing process is performed on the band 8, and the rendered data of the band 8 is written in the rendering memory 105*a* corresponding to the write memory number "1" (C6).

Subsequently, a flag determination is performed (C7). Since "flag=0", the read memory number is incremented by 1 to set the read memory number to "3", and "flag=1" is set.

The rendered data of the band 7 is read from the rendering memory 105*c* corresponding to the read memory number "3", and the output process is performed (C10).

The read order is reversed to "+".

The next process is kept in a standby state until the process for one band ends (C12).

The process proceeds to the next step except in a case where the process on all the bands has ended (C13).

Subsequently, in order to perform the output process on the band 8, band information (rendering type, etc.) about the band 8 is obtained (C1).

It is determined whether the band 9, next to the band 8, is the target of the pre-rendering process (C2).

As a result of the determination made in step C2, the band 9 is the target of the pre-rendering process (YES in C2), and thus the write memory number is incremented by 1 in order to specify the memory in which the decompressed data of the band 9 is to be written.

The write memory number is "1" and the write order is "−", and thus the write memory number is set to "3" (C5).

A decompressing process is performed on the band 9, and the rendered data of the band 9 is written in the rendering memory 105*c* corresponding to the write memory number "3" (C6).

Then, a flag determination is performed (C7). Since "flag=1", the write order is reversed to "+" (C8).

The read memory number is incremented by 1 and "flag=1" is set (C9).

Since the read memory number is "3" and the read order is "+", the read memory number is set to "1".

The rendered data of the band 8 is read from the rendering memory 105*a* corresponding to the read memory number "1", and the output process is performed (C10).

The read order is reversed to "−" (C11).

The next process is kept in a standby state until the process for one band ends (C12).

The process proceeds to the next step except in a case where the process on all the bands has ended (C13).

In order to perform the output process on the band 9, band information (rendering type, etc.) about the band 9 is obtained (C1).

It is determined whether the band 10, next to the band 9, is the target of the pre-rendering process (C2).

As a result of the determination made in step C2, the band 10 is not the target of the pre-rendering process (NO in C2), and thus the read memory number is incremented by 1 and the memory counter is decremented by 1 (C3).

Since the read memory number is "1" and the read order is "−", the read memory number is set to "3", whereas the memory counter changes from "3" to "2".

After the memory setting performed in step C3, the rendered data of the band 9 is read from the rendering memory 105*c* corresponding to the read memory number "3", and the output process is performed (C4).

The next process is kept in a standby state until the process for one band ends (C12).

The process proceeds to the next step except in a case where the process on all the bands has ended (C13).

The process returns to step B13 in FIG. 4. Since the memory counter is not full any more due to the process in step C3 (NO in B13), the write memory number is incremented by 1, and the memory counter is incremented by 1 to "3" (B14).

Since the write memory number is "3" and the write order is "+", the write memory number is set to "1".

After the memory setting performed in step B14, the rendered data of the band 11 is written in the rendering memory 105*a* corresponding to the write memory number "1" (B15).

A flag determination is performed (B16). It is determined that "flag=1", and thus the write order is reversed to "−" and "flag=0" is set, and the process proceeds to step B3 (B17).

After the rendering process on the band 11 has ended (YES in B3), the process proceeds to the next step except in a case where the rendering process on all the bands has ended.

The rendering control unit 103 obtains various pieces of information about the band 12, which is the next target of the rendering process (B5), and determines the rendering type of the band 12 (B6).

As a result of the determination made in step B6, it is determined that a subsequent real-time rendering process is to be performed on the band 12 ("C" in B6). Then, it is determined whether the memory counter is full (3) (B13).

As a result of the determination made in step B13, the memory counter is full, and thus the process proceeds to the output process illustrated in FIG. 5.

In order to perform the output process on the band 10, band information (rendering type, etc.) about the band 10 is obtained (C1).

It is determined whether the band 11, next to the band 10, is the target of the pre-rendering process (C2).

As a result of the determination made in step C2, the band 11 is not the target of the pre-rendering process (NO in C2), and thus the read memory number is incremented by 1 and the memory counter is decremented by 1 (C3).

Since the read memory number is "3" and the read order is "−", the read memory number is set to "2", whereas the memory counter changes from "3" to "2".

After the memory setting performed in step C3, the rendered data of the band 10 is read from the rendering memory 105*b* corresponding to the read memory number "2", and the output process is performed (C4).

The next process is kept in a standby state until the process for one band ends (C12).

The process proceeds to the next step except in a case where the process on all the bands has ended (C13).

The process returns to step B13 in FIG. 4. Since the memory counter is not full any more due to the process in step C3 (NO in B13), the write memory number is incremented by 1, and the memory counter is incremented by 1 to "3" (B14).

Since the write memory number is "1" and the write order is "−", the write memory number is set to "3".

After the memory setting performed in step B14, the rendered data of the band 12 is written in the rendering memory 105*c* corresponding to the write memory number "3" (B15).

A flag determination is performed (B16). It is determined that "flag=0", and thus the process proceeds to step B3 (B17).

After the rendering process on the band 12 has ended (YES in B3), the process proceeds to the next step except in a case where the rendering process on all the bands has ended.

The rendering control unit 103 obtains various pieces of information about the band 13, which is the next target of the rendering process (B5), and determines the rendering type of the band 13 (B6).

As a result of the determination made in step B6, it is determined that a subsequent real-time rendering process is to be performed on the band 13 ("C" in B6). Then, it is determined whether the memory counter is full (3) (B13).

As a result of the determination made in step B13, the memory counter is full, and thus the process proceeds to the output process illustrated in FIG. 5.

In order to perform the output process on the band 11, band information (rendering type, etc.) about the band 11 is obtained (C1).

It is determined whether the band 12, next to the band 11, is the target of the pre-rendering process (C2).

As a result of the determination made in step C2, the band 12 is not the target of the pre-rendering process (NO in C2), and thus the read memory number is incremented by 1 and the memory counter is decremented by 1(C3).

Since the read memory number is "2" and the read order is "–", the read memory number is set to "1", whereas the memory counter changes from "3" to "2".

After the memory setting performed in step C3, the rendered data of the band 11 is read from the rendering memory 105a corresponding to the read memory number "1", and the output process is performed (C4).

The next process is kept in a standby state until the process for one band ends (C12).

The process proceeds to the next step except in a case where the process on all the bands has ended (C13).

The process returns to step B13 in FIG. 4. Since the memory counter is not full any more due to the process in step C3 (NO in B13), the write memory number is incremented by 1, and the memory counter is incremented by 1 to "3" (B14).

Since the write memory number is "3" and the write order is "–", the write memory number is set to "2".

After the memory setting performed in step B14, the rendered data of the band 13 is written in the rendering memory 105b corresponding to the write memory number "2" (B15).

A flag determination is performed (B16). It is determined that "flag=0", and thus the process proceeds to step B3 (B17).

After the rendering process on the band 13 has ended (YES in B3), the process proceeds to the next step except in a case where the rendering process on all the bands has ended.

The rendering control unit 103 obtains various pieces of information about the band 14, which is the next target of the rendering process (B5), and determines the rendering type of the band 14 (B6).

As a result of the determination made in step B6, it is determined that a subsequent real-time rendering process is to be performed on the band 14 ("C" in B6). Then, it is determined whether the memory counter is full (3) (B13).

As a result of the determination made in step B13, the memory counter is full, and thus the process proceeds to the output process illustrated in FIG. 5.

In order to perform the output process on the band 12, band information (rendering type, etc.) about the band 12 is obtained (C1).

It is determined whether the band 13, next to the band 12, is the target of the pre-rendering process (C2).

As a result of the determination made in step C2, the band 13 is not the target of the pre-rendering process (NO in C2), and thus the read memory number is incremented by 1 and the memory counter is decremented by 1(C3).

Since the read memory number is "1" and the read order is "–", the read memory number is set to "3", whereas the memory counter changes from "3" to "2".

After the memory setting performed in step C3, the rendered data of the band 12 is read from the rendering memory 105c corresponding to the read memory number "3", and the output process is performed (C4).

The next process is kept in a standby state until the process for one band ends (C12).

The process proceeds to the next step except in a case where the process on all the bands has ended (C13).

The process returns to step B13 in FIG. 4. Since the memory counter is not full any more due to the process in step C3 (NO in B13), the write memory number is incremented by 1, and the memory counter is incremented by 1 to "3" (B14).

Since the write memory number is "2" and the write order is "–", the write memory number is set to "1".

After the memory setting performed in step B14, the rendered data of the band 14 is written in the rendering memory 105a corresponding to the write memory number "1" (B15).

A flag determination is performed (B16). It is determined that "flag=0", and thus the process proceeds to step B3 (B17).

When the rendering unit 104 ends the rendering process on the band 14 (YES in B3), the rendering process on all the bands ends (YES in B4), so that the process of setting the write memory related to the rendering process ends.

In order to perform the output process on the band 13, band information (rendering type, etc.) about the band 13 is obtained (C1).

It is determined whether the band 14, next to the band 13, is the target of the pre-rendering process (C2).

As a result of the determination made in step C2, the band 14 is not the target of the pre-rendering process (NO in C2), and thus the read memory number is incremented by 1 and the memory counter is decremented by 1(C3).

Since the read memory number is "3" and the read order is "–", the read memory number is set to "2", whereas the memory counter changes from "3" to "2".

After the memory setting performed in step C3, the rendered data of the band 13 is read from the rendering memory 105b corresponding to the read memory number "2", and the output process is performed (C4).

The next process is kept in a standby state until the process for one band ends (C12).

The process proceeds to the next step except in a case where the process on all the bands has ended (C13).

Subsequently, in order to perform the output process on the band 14, band information (rendering type, etc.) about the band 14 is obtained (C1).

It is determined whether the band next to the band 14 is the target of the pre-rendering process (C2).

The band next to the band 14 does not exist, and thus the pre-rendering process is not performed (NO in C2).

The read memory number is incremented by 1 and the memory counter is decremented by 1(C3).

Since the read memory number is "2" and the read order is "–", the read memory number is set to "1", whereas the memory counter changes from "2" to "1".

After the memory setting performed in step C3, the rendered data of the band 14 is read from the rendering memory 105a corresponding to the read memory number "1", and the output process is performed (C4).

The next process is kept in a standby state until the process for one band ends (C12).

The process on all the bands ends (YES in C13), whereby the process of the read memory related to the output process ends.

FIGS. 6A and 6B are tables illustrating the correspondence between the transition of the memory numbers and the band numbers in a case where the image forming apparatus 10 according to the embodiment renders and outputs the sample print data illustrated in FIG. 3.

The correspondence between the transition of the read memory numbers and the band numbers illustrated in FIG. 6A is obtained by performing the above-described processes based on the flowcharts illustrated in FIGS. 4 and 5. The correspondence between the transition of the read memory numbers and the band numbers is illustrated in FIG. 6B.

As illustrated in FIGS. 6A and 6B, a rendering process can be performed as soon as a memory becomes available by reversing the writing and reading cycles or by recovering the original cycle.

Figure 7:
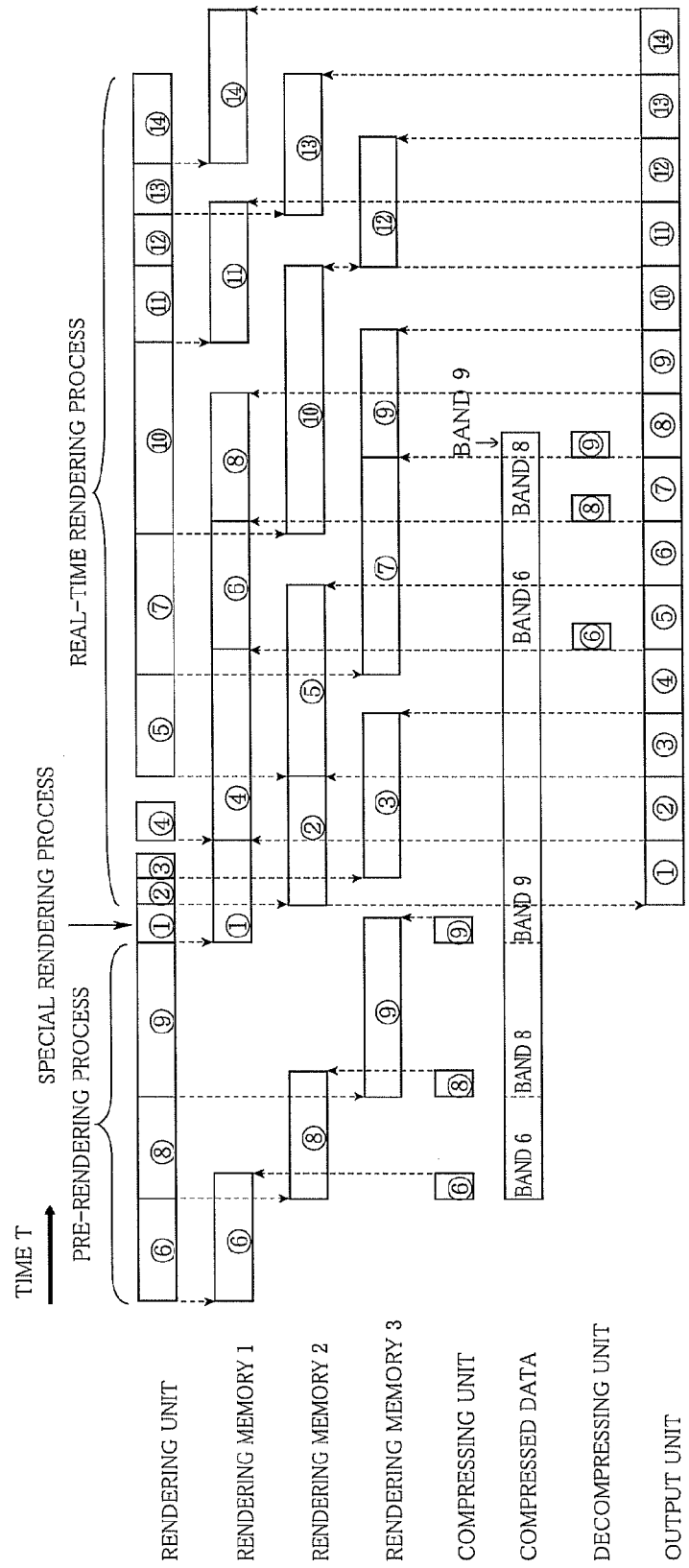
FIG. 7 is a time chart illustrating, in time series, a result of rendering and outputting of the sample print data illustrated in FIG. 3 performed by the image forming apparatus according to the embodiment.

FIG. 7 is a time chart illustrating a result of rendering and outputting of the sample print data illustrated in FIG. 3 performed by the image forming apparatus 10 according to the embodiment.

As illustrated in FIG. 7, in the image forming apparatus 10 according to the embodiment, the time until first printing is shortened, the rendering wait time in the real-time rendering process is shortened, and the entire throughput of output is enhanced compared to a conventional image forming apparatus.

Figure 8:
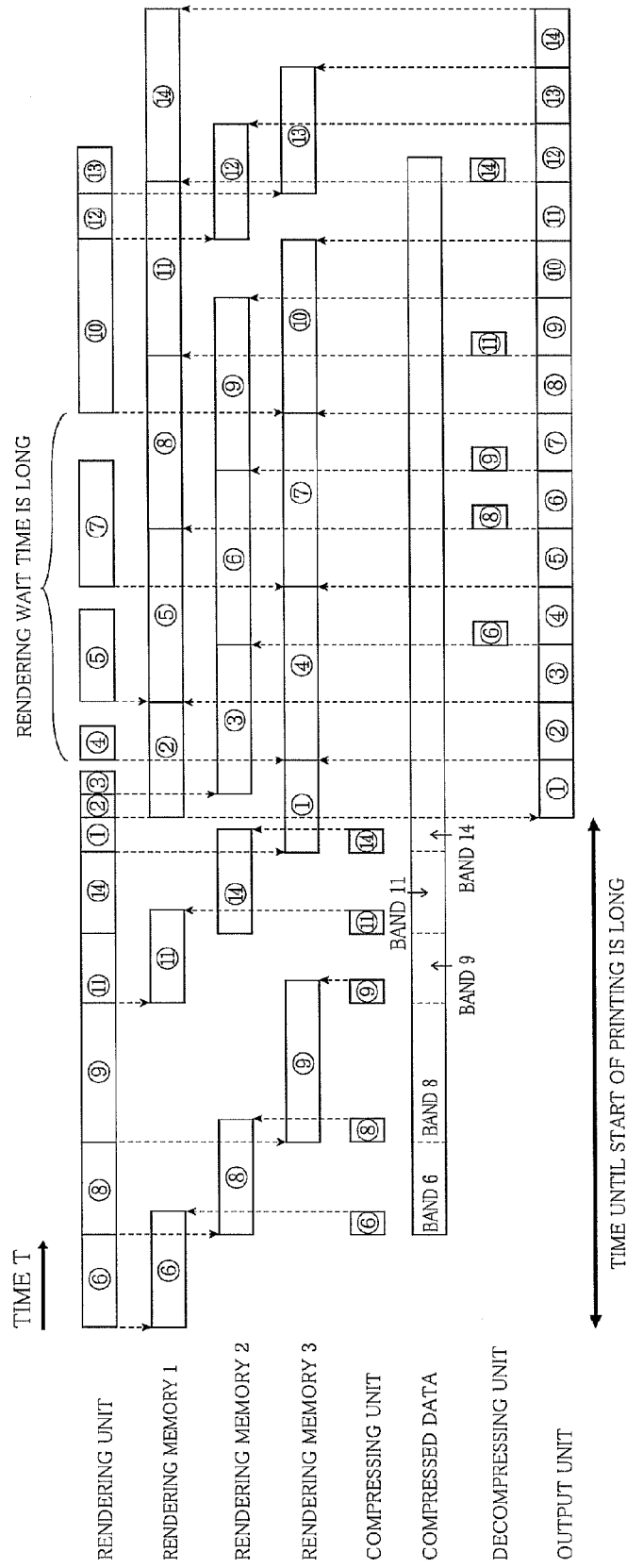
FIG. 8 is a time chart illustrating, in time series, a result of rendering and outputting of the sample print data illustrated in FIG. 3 performed by a conventional image forming apparatus provided with three memories.

FIG. 8 is a time chart illustrating a result of rendering and outputting of the sample print data illustrated in FIG. 3 performed by a conventional image forming apparatus provided with three memories.

In the image forming apparatus illustrated in FIG. 8, no special memory control is performed, and writing on the memories and reading from the memories in the band order are performed on the basis of an ordinary banding process.

When FIGS. 7 and 8 are compared to each other, in the image forming apparatus 10 according to the embodiment, (1) the number of bands subject to the pre-rendering process is small, and the time until first printing can be shortened accordingly, (2) the rendering wait time in the real-time rendering process is short, so that the rendering process and the output process are efficiently performed, (3) the page output time from the start to end of output can be shortened, and (4) the total processing time from the start of the pre-processing to the end of output can be shortened.

As described above, according to the image forming apparatus 10 of the embodiment, the three rendering memories 105a to 105c are mounted, and writing and reading of rendered data are alternately performed in a predetermined cycle, whereby the output throughput is enhanced with overrun prevented.

The rendering process on all the bands is not performed in the band order, but three or more memories are effectively used by using arithmetic expressions peculiar to the present invention. Accordingly, a free time of the memories can be effectively used, and the targets of the pre-rendering process are effectively reduced.

In a conventional method using two memories, all the data for which the rendering time exceeds the output time is a target of the pre-rendering process, which causes the time until the start of printing to be longer. According to the image forming apparatus 10 of the embodiment, such a waste can be eliminated.

In the image forming apparatus 10 according to the embodiment, a decompressing process on a band is performed at the same time as the start of output of the immediately preceding band (i.e., at the same time as the end of a rendering process on the band located two bands before) by taking advantage of the characteristic that the times for compressing and decompressing are shorter than the output time. Furthermore, decompressed data is held in common in the three rendering memories 105a to 105c together with other rendered data.

In the image forming apparatus 10 according to the embodiment, a memory hold time until decompressed data is output can be shortened, so that an efficient use of memories with little waste can be realized overall.

As described above, the targets of the pre-rendering process can be reduced, and thus the time until first printing can be shortened and the memory size related to pre-rendering (compression memory) can be reduced.

Also, the rendering wait time is reduced. As a result, the total processing time is shortened and high-speed output can be realized.

Furthermore, an effective use of rendering memories is realized, so that the individual storage areas can be reduced even though the number of memories is plural. As a result, the total cost of the memories can be reduced.

The above-described image forming apparatus 10 according to the embodiment is realized by processes, means, and functions executed by instructions of a program (software). The program transmits instructions to respective components of the computer and allows the components to perform a predetermined process or function. Each unit in the image forming apparatus 10 according to the embodiment is realized by specific means in which the program and the computer cooperate with each other.

The whole or part of the program is provided via an arbitrary computer-readable recording medium, such as a magnetic disk, an optical disc, or a semiconductor memory. The program read from the recording medium is installed in the computer and is executed. The program can be directly loaded to the computer through a communication line without use of a recording medium and can be executed.

A preferred embodiment of the image forming apparatus according to the present invention has been described. The image forming apparatus according to the present invention is not limited to the above-described embodiment, and can be variously modified within the scope of the present invention.

For example, the above-described image forming apparatus 10 according to the embodiment is provided with three physical rendering memories, but the present invention is not limited to this configuration. At least one storage medium having three storage areas may be provided.

What is claimed is:

1. An image forming apparatus comprising:
an intermediate data generating unit configured to divide image data into predetermined bands and generate pieces of intermediate data corresponding to the bands;
a rendering unit configured to perform a rendering process on the pieces of intermediate data in a predetermined band order;
a storage unit configured to store pieces of rendered data obtained through the rendering process;
a rendering time calculating unit configured to calculate rendering times for the respective pieces of intermediate data generated by the intermediate data generating unit;
a rendering control unit configured to determine which of a pre-rendering process and a real-time rendering process is to be performed on the respective pieces of intermediate data based on the rendering times, rendering being performed before output of a piece of intermediate data in the pre-rendering process and rendering being performed in parallel with output of another piece of intermediate data in the real-time rendering process, the rendering control unit further configured to cause the rendering unit to perform either of the pre-rendering process and the real-time rendering process;
a pre-writing unit configured to compress pieces of rendered data obtained through the pre-rendering process and write the pieces of rendered data in a predetermined compression storage area of the storage unit;
a decompressing unit configured to perform a decompressing process on the pieces of rendered data written in the compression storage area of the storage unit;
a rendering writing unit configured to write the pieces of rendered data obtained through performance of one of the rendering process and the decompressing process in a storage area selected from the storage unit;
a reading unit configured to read the pieces of rendered data written in the storage areas in the predetermined band order; and
an output unit configured to output to a printer engine the pieces of rendered data read by the reading unit;
wherein the storage unit includes at least three storage areas,
wherein the rendering writing unit switches in a certain cycle among the storage areas in which the pieces of rendered data are to be written,
wherein, based on the cycle, the reading unit sequentially reads from the storage areas the pieces of rendered data written in the storage areas,
wherein, in a case where the pieces of rendered data include a piece of rendered data on which the pre-rendering process has been performed, the rendering writing unit reverses the cycle on the basis of a predetermined rule to switch among the storage areas in which the pieces of rendered data are to be written, and
wherein, on the basis of the predetermined rule, the reading unit reads from the storage areas the pieces of rendered data written in the storage areas by reversing the cycle.

2. The image forming apparatus according to claim 1, wherein the rendering control unit causes the decompressing process and the real-time rendering process to be performed in an order based on the cycle.

3. The image forming apparatus according to claim 1, wherein the rendering control unit causes the rendering unit to perform a special rendering process on a piece of intermediate data of a first band, rendering being performed after the pre-rendering process and before the real-time rendering process in the special rendering process,
wherein the rendering writing unit writes the piece of rendered data obtained through performance of the special rendering process in any of the at least three storage areas, and
wherein the reading unit reads the piece of rendered data obtained through performance of the special rendering process and written in the storage area.

4. The image forming apparatus according to claim 3, wherein the rendering control unit causes the rendering unit to start the real-time rendering process on target pieces of intermediate data after the special rendering process has ended,
wherein the rendering writing unit sequentially writes the pieces of rendered data obtained through performance of the real-time rendering process in the storage areas in a certain cycle starting from another storage area different from the storage area in which the piece of rendered data obtained through performance of the special rendering process is written, and
wherein the reading unit sequentially reads the pieces of rendered data obtained through performance of the real-time rendering process on the basis of the cycle starting from the other storage area.

5. The image forming apparatus according to claim 1, wherein the decompressing unit performs the decompressing process on a piece of rendered data written in the compression storage area at a time selected from (1) when rendering ends for a piece of intermediate data related to a band located two bands before a band corresponding to the piece of rendered data and (2) when output starts for a piece of rendered data related to an immediately preceding band, and
wherein the rendering writing unit writes the piece of rendered data obtained through the decompressing process in the storage area in which the piece of rendered data of the band located two bands before the band corresponding to the piece of rendered data had been written.

6. The image forming apparatus according to claim 5, wherein the rendering control unit causes the rendering unit to perform the real-time rendering process on the piece of intermediate data related to the band next to the band of the piece of rendered data obtained through the decompressing process immediately before the decompressing process.

7. The image forming apparatus according to claim 1, wherein the rendering writing unit performs writing in the storage areas by reversing the cycle after writing in a storage area located two storage areas after the storage area in which the piece of rendered data obtained through the decompressing process is written.

8. The image forming apparatus according to claim 1, wherein the reading unit performs reading from the storage areas by reversing the cycle after reading from the storage area in which the piece of rendered data obtained through the decompressing process is written.

9. The image forming apparatus according to claim 1, wherein a margin T regarding each of the bands except a first band is calculated by using an expression $T=t+S-R$, t being a margin of an immediately preceding band, S being an output time of each of the bands, R being a rendering time of the band, and the margin T and the margin t both being 0 for the first band, and
wherein, in a case where the margin T is smaller than 0, the rendering control unit causes the pre-rendering process to be performed on the respective pieces of intermediate data, and in a case where the margin T is greater than or equal to 0, the rendering control unit causes the real-time rendering process to be performed on the respective pieces of intermediate data.

10. The image forming apparatus according to claim 9, wherein, in a case where the rendering control unit causes the pre-rendering process to be performed on an arbitrary band, the margin t for a band next to the arbitrary band is calculated by using an expression $t=T+R$, and
wherein, in a case where the rendering control unit causes the real-time rendering process to be performed on an arbitrary band, the margin t for a band next to the arbitrary band is calculated by using an expression $t=S$, with $T>S$ being satisfied, and an expression $t=T$, with $T \leq S$ being satisfied.

11. An image forming method comprising:
an intermediate data generating step of dividing image data into predetermined bands and generating pieces of intermediate data corresponding to the bands;
a rendering time calculating step of calculating rendering times for the respective pieces of intermediate data generated in the intermediate data generating step;

a rendering control step of (1) determining which of a pre-rendering process and a real-time rendering process is to be performed on the respective pieces of intermediate data based on the rendering times, rendering being performed before output of a piece of intermediate data in the pre-rendering process and rendering being performed in parallel with output of another piece of intermediate data in the real-time rendering process, and (2) causing either of the pre-rendering process and the real-time rendering process to be performed;

a pre-writing step of compressing pieces of rendered data obtained through the pre-rendering process and writing the pieces of rendered data in a predetermined compression storage area;

a decompressing step of performing a decompressing process on the pieces of rendered data written in the compression storage area;

a rendering writing step of writing the pieces of rendered data obtained through performance of the real-time rendering process or the decompressing process in any of storage areas selected from a storage unit on the basis of a predetermined rule;

a reading step of reading the pieces of rendered data written in the storage areas in a predetermined band order; and an output step of outputting the pieces of rendered data read from the storage unit to a printer engine;

wherein the storage unit includes at least three storage areas, wherein the rendering writing step switches in a certain cycle among the storage areas in which the pieces of rendered data are to be written, wherein, based on the cycle, the reading step sequentially reads from the storage areas the pieces of rendered data written in the storage areas, wherein, in a case where the pieces of rendered data include a piece of rendered data on which the pre-rendering process has been performed, the rendering writing step reverses the cycle on the basis of a predetermined rule to switch among the storage areas in which the pieces of rendered data are to be written, and wherein, on the basis of the predetermined rule, the reading step reads from the storage areas the respective pieces of rendered data written in the storage areas by reversing the cycle.

12. The image forming method according to claim 11, wherein the rendering control step causes the decompressing process and the real-time rendering process to be performed in an order based on the cycle.

13. The image forming method according to claim 11, wherein the rendering control step causes a special rendering process to be performed on a piece of intermediate data of a first band, rendering being performed after the pre-rendering process and before the real-time rendering process in the special rendering process, wherein the rendering writing step writes the piece of rendered data obtained through performance of the special rendering process in any of the storage areas, and wherein the reading step reads the piece of rendered data obtained through performance of the special rendering process and written in the storage area.

14. The image forming method according to claim 11, wherein the decompressing step performs the decompressing process on a piece of rendered data written in the compression storage area at a time selected from (1) when rendering ends for a piece of intermediate data related to a band located two bands before a band corresponding to the piece of rendered data or (2) when output starts for a piece of rendered data related to an immediately preceding band, and wherein the rendering writing step writes the piece of rendered data obtained through the decompressing process in the storage area in which the piece of rendered data of the band located two bands before the band corresponding to the piece of rendered data had been written.

15. An image forming method comprising:

an intermediate data generating step of dividing image data into predetermined bands and generating pieces of intermediate data corresponding to the bands;

a rendering time calculating step of calculating rendering times for the respective pieces of intermediate data generated in the intermediate data generating step;

a rendering control step of (1) determining which of a pre-rendering process and a real-time rendering process is to be performed on the respective pieces of intermediate data based on the rendering times, rendering being performed before output of a piece of intermediate data in the pre-rendering process and rendering being performed in parallel with output of another piece of intermediate data in the real-time rendering process, and (2) causing either of the pre-rendering process and the real-time rendering process to be performed;

a pre-writing step of compressing pieces of rendered data obtained through the pre-rendering process and writing the pieces of rendered data in a predetermined compression storage area that includes at least three storage areas;

a decompressing step of performing a decompressing process on the pieces of rendered data written in the compression storage area, wherein the decompressing step performs the decompressing process on a piece of rendered data written in the compression storage area at a time selected from (1) when rendering ends for a piece of intermediate data related to a band located two bands before a band corresponding to the piece of rendered data or (2) when output starts for a piece of rendered data related to an immediately preceding band;

a rendering writing step of writing the pieces of rendered data obtained through performance of the real-time rendering process or the decompressing process in a certain cycle that switches writing among the least three storage areas on the basis of a predetermined rule that includes writing the piece of rendered data obtained through the decompressing process in the storage area in which the piece of rendered data of the band located two bands before the band corresponding to the piece of rendered data had been written;

a reading step of reading the pieces of rendered data written in the storage areas in a predetermined band order, wherein, based on the predetermined rule, the reading step reads from the storage areas the respective pieces of rendered data written in the storage areas by reversing the cycle; and an output step of outputting the pieces of rendered data read from the storage unit to a printer engine.

16. The image forming method according to claim 15, wherein the rendering control step causes the decompressing process and the real-time rendering process to be performed in an order based on the cycle.

17. The image forming method according to claim 15, wherein the rendering control step causes a special rendering process to be performed on a piece of intermediate data of a first band, rendering being performed after the pre-rendering process and before the real-time rendering process in the special rendering process, wherein the rendering writing step writes the piece of rendered data obtained through performance of the special rendering process in any of the storage areas, and wherein the reading step reads the piece of rendered data obtained through performance of the special rendering process and written in the storage area.

\* \* \* \* \*